US008766771B2

(12) United States Patent
Mori (10) Patent No.: US 8,766,771 B2
(45) Date of Patent: Jul. 1, 2014

(54) IMAGE PROCESSING APPARATUS AND COMPUTER READABLE MEDIUM (75) Inventor: Yasuhiro Mori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 673 days.

(21) Appl. No.: 13/032,788

(22) Filed: Feb. 23, 2011

(65) Prior Publication Data

US 2012/0038457 A1   Feb. 16, 2012

(30) Foreign Application Priority Data

Aug. 12, 2010 (JP) ................................. 2010-180786

(51) Int. Cl.
G05B 23/02 (2006.01)
G06F 3/041 (2006.01)
G06T 15/00 (2011.01)
G09G 5/00 (2006.01)
H04N 5/45 (2011.01)

(52) U.S. Cl.
USPC ........... 340/5.74; 340/3.1; 340/3.7; 340/3.71; 345/173; 345/214; 348/565; 348/607; 348/E5.104

(58) Field of Classification Search
USPC ................... 340/5.74, 3.1, 3.7, 3.71; 700/126
See application file for complete search history.

(56) References Cited

U.S. PATENT DOCUMENTS

| 6,295,065 | B1 * | 9/2001 | Tettington | 345/419 |
| 8,037,521 | B2 | 10/2011 | Minato | |
| 8,266,625 | B2 | 9/2012 | Yuki | |
| 2002/0033899 | A1 * | 3/2002 | Oguma | 348/565 |
| 2002/0180579 | A1 * | 12/2002 | Nagaoka et al. | 340/3.1 |
| 2005/0231760 | A1 | 10/2005 | Minato | |
| 2006/0217831 | A1 * | 9/2006 | Butterworth et al. | 700/126 |
| 2008/0250494 | A1 * | 10/2008 | Nagata | 726/19 |
| 2010/0064288 | A1 | 3/2010 | Yuki | |
| 2010/0268690 | A1 * | 10/2010 | Anderson et al. | 707/661 |
| 2013/0210528 | A1 * | 8/2013 | Pereira et al. | 463/42 |

FOREIGN PATENT DOCUMENTS

| JP | 2003-345753 A | 12/2003 |
| JP | 2004-302209 A | 10/2004 |
| JP | 2005-135319 A | 5/2005 |
| JP | 2005-301601 A | 10/2005 |
| JP | 2006-92448 A | 4/2006 |
| JP | 2006-172398 A | 6/2006 |
| JP | 2010-66797 A | 3/2010 |

OTHER PUBLICATIONS

Office Action dated Apr. 2, 2014 issued by the Japanese Patent Office in counterpart Japanese Patent Application No. 2010-180786.

* cited by examiner

Primary Examiner — Fekadeselassie Girma
(74) Attorney, Agent, or Firm — Sughrue Mion, PLLC (57) ABSTRACT An information processing apparatus includes a display control section that performs display control of a first operation screen for performing first operation and a second operation screen for performing second operation. The information processing apparatus also includes a control section that performs control of terminating the first operation screen or making the first operation screen invisible based on information as to whether or not the user needs to authenticate display of the first operation screen or display of the second operation screen when the second operation screen is displayed in a state in which the first operation screen is displayed.

3 Claims, 10 Drawing Sheets

| NEWLY STARTED APPLICATION B | NO AUTHENTICATION | AUTHENTICATION |
|---|---|---|
| APPLICATION A | NOT TERMINATE | TERMINATE |
| APPLICATION B | OPEN | OPEN |

| BEFORE OPERATION | ALREADY STARTED APPLICATION A | AUTHENTICATION | | NO AUTHENTICATION | |
|---|---|---|---|---|---|
| | APPLICATION B TO BE NEWLY STARTED | NO AUTHENTICATION | AUTHENTICATION | NO AUTHENTICATION | AUTHENTICATION |
| AFTER OPERATION | APPLICATION A | NOT TERMINATE | TERMINATE | NOT TERMINATE | NOT TERMINATE |
| | APPLICATION B | OPEN | OPEN | OPEN | OPEN |

IMAGE PROCESSING APPARATUS AND COMPUTER READABLE MEDIUM

CROSS-REFERENCE TO RELATED APPLICATION

This application is based on and claims priority under 35 USC 119 from Japanese Patent Application No. 2010-180786 filed on Aug. 12, 2010.

BACKGROUND

Technical Field

This invention relates to an image processing apparatus and computer readable medium.

SUMMARY

According to an aspect of the invention, an information processing apparatus includes a display control section that performs display control of a first operation screen for performing first operation and a second operation screen for performing second operation; and a control section that performs control of terminating the first operation screen or making the first operation screen invisible based on information as to whether or not the user needs to authenticate display of the first operation screen or display of the second operation screen when the second operation screen is displayed in a state in which the first operation screen is displayed.

BRIEF DESCRIPTION OF THE DRAWINGS

Exemplary embodiments of the invention will be described in detail based on the following figures, wherein.

DETAILED DESCRIPTION (Information Processing Apparatus)

Figure 1:
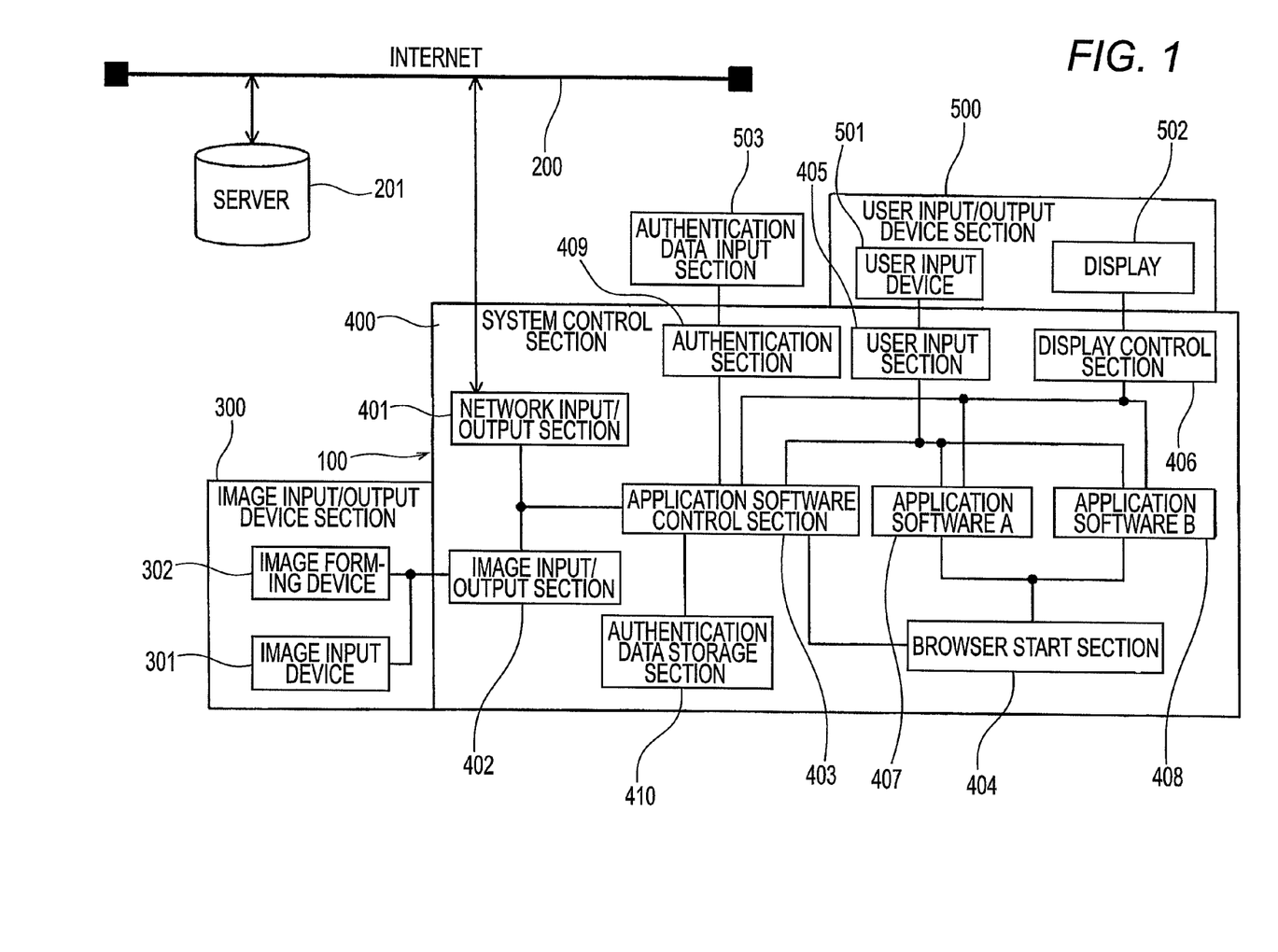
FIG. 1 is a block diagram of an information processing apparatus of an exemplary embodiment of the invention.

An example using the invention will be discussed below: FIG. 1 shows an information processing apparatus 100 using the invention. The information processing apparatus 100 is connected to an Internet line 200. A server 201 is connected to the Internet line 200 and the information processing apparatus 100 may download various application software products from the server 201 through the Internet line 200 and may use the application software.

The information processing apparatus 100 includes an image input/output device section 300, a system control section 400, and a user input/output device section 500. The image input/output device section 300 includes an image input device 301 and an image forming device 302. The image input device 301 has the function of an image scanner for optically reading an image printed on a record material of paper, etc., and converting the image into image data. The image forming device 302 has the function of a printer for printing an image on a record medium of paper, etc., based on the image data. The image data input to the image forming device 302 is image data acquired through a network input/output section 401 in addition to the image data acquired by the image input device 301.

The system control section 400 has the function of a computer and includes a network input/output section 401, an image input/output section 402, an application software control section 403, a browser start section 404, a user input section 405, and a display control section 406. The network input/output section 401 conducts communications using the Internet line 200 and inputs and outputs data used in the information processing apparatus 100. In the example, the system control section 400 is connected to the Internet line 200 through the network input/output section 401, but may also be connected to any other type of communication line such as a LAN. The image input/output section 402 transfers image data to and from the image input/output device section 300. The application software control section 403 performs operation control of application software downloaded from the server 201. The browser start section 404 selects application software in response to a start request of the application software selected by the user.

FIG. 1 shows "application software A" 407 and "application software B" 408 as application software downloaded from the server 201. As the application software, for example, software for creating accounting documents, software for creating various typical documents, etc., may be named.

The application software used in the information processing apparatus is not limited to the application software downloaded from the outside and may be application software installed in an internal appropriate storage area. Application software may be downloaded from an appropriate storage medium for use.

The user input section 405 accepts various types of operation performed by the user using a user input device 501 (described later) of a touch panel display, a keyboard, a mouse, etc. The display control section 406 outputs an operation screen and information provided for the user to a display 502 as image information.

The system control section 400 also includes an authentication section 409 and an authentication data storage section 410. The authentication section 409 acquires code information of a magnetic card held by the user, collates it with previously stored reference data, and determines whether or not authorized ID information is input. The user is authenticated by the determination. The authentication data storage section 410 holds information as to whether or not usable application software is software requiring authentication. The information is acquired based on status information on network protocol at the start time of application software reported from the server 201 or a protocol header reported from the server 201. Of course, whether or not authentication is required may be determined by the user and the determination may be stored in the authentication data storage section 410.

The user input/output device section 500 includes a user input device 501 and a display 502. The user input device 501 is a touch panel display, a keyboard, a mouse, etc., operated by the user. The user operates the user input device 501, whereby various types of work using the information processing apparatus 100 are performed. The display 502 is a touch panel display or a liquid crystal display for displaying an image. The display 502 displays operation screens required for operating application software A, application software B, and the information processing apparatus 100.

An authentication data input section 503 is connected to the information processing apparatus. The authentication data input section 503 has a magnetic reader for reading code information from a magnetic card and a function of decoding the code read by the magnetic reader. The decoded data is sent to the authentication section 409. Here, authentication is conducted using a magnetic card by way of example, but biometric authentication using a finger print or an iris and authentication conducted as the user enters a password from the user input device 501 are also possible.

Operation Example 1

Figure 2:
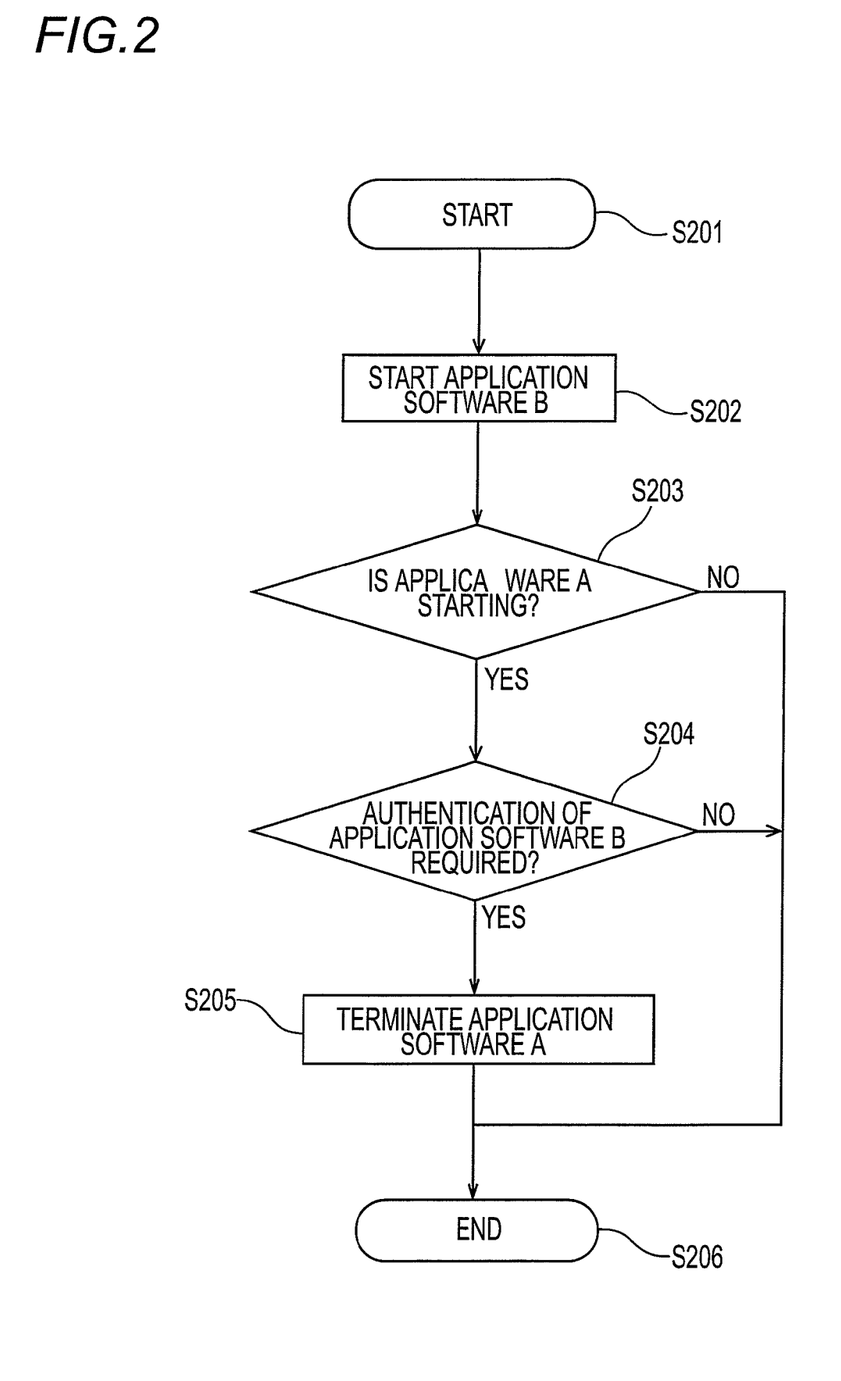
FIG. 2 is a flowchart to show an example of a processing procedure of the exemplary embodiment of the invention.

An example of the operation of the information processing apparatus 100 will be discussed. FIG. 2 shows an example of the operation of the information processing apparatus 100. A program for performing the processing in FIG. 2 is stored in a storage area in the information processing apparatus 100. The program may be provided through a line or an external storage medium.

In the example, the information processing apparatus 100 may use the application software A and the application software B. Of course, any other application software may be able to be used, but will not be discussed here. In the description to follow, expression "application software is starting" is used to mean that the application software is started and may be operated.

An example of the operation when the user starts the application software B will be discussed. In some of the figures, the application software A is abbreviated as application A and the application software B is abbreviated as application B. When processing is started (step S201) and the user gives a start command of the application software B, the application software B is started (step S202). Whether or not the application software A is already started at the point in time is determined (step S203).

If the application software A is starting, the process goes to step S204; otherwise, the processing is terminated (step S206). At step S204, whether or not authentication of the application software B is required for operating the software is determined. If the application software B is application software requiring authentication, the process goes to step S205 and the application software A which is already started and may be operated is terminated. If authentication of the application software B is not required for operating the software at step S204, the process goes to step S206 and the processing is terminated.

Figure 3:
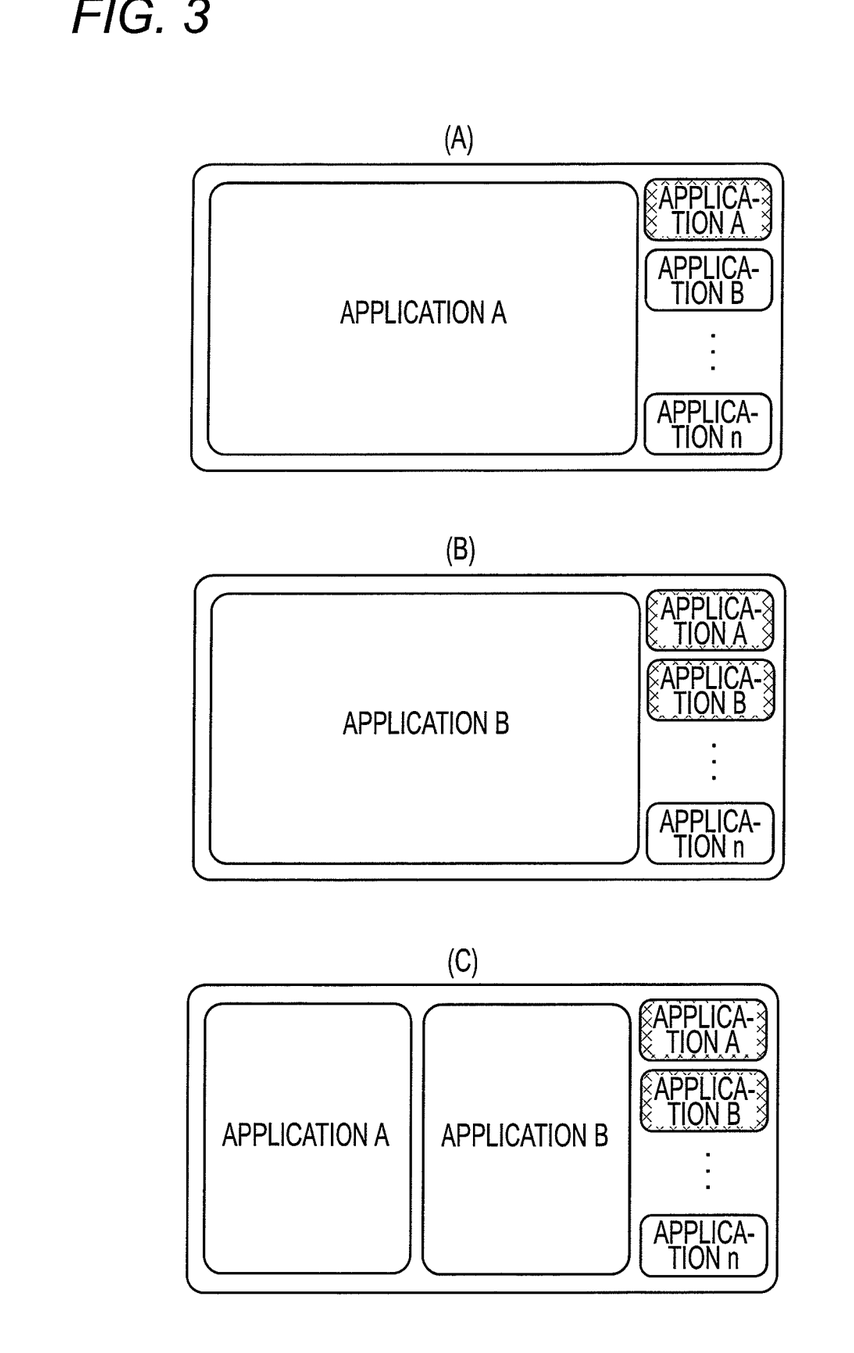
FIG. 3 is a screen display drawing to show an example of screen display of operation screens in the exemplary embodiment of the invention.

If the determination at step S203 or S204 is NO and the process goes to step S206 and the processing is terminated, an operation screen of the application software B is displayed overlapping (see Step (B) in FIG. 3) an operation screen of the application software A (see Step (A) in FIG. 3) or the operation screen of the application software A and the operation screen of the application software B are displayed side by side (see Step (C) in FIG. 3). In this state, the application software A and the application software B may be operated. In FIG. 3, the right display buttons have a function of selecting application software and a function of indicating whether or not the corresponding application software is starting. For example, when application A is selected, a start command of the application software A is given. The color changes (in the figure, darkens), whereby the fact that the application software is starting is visually displayed.

Figure 4:
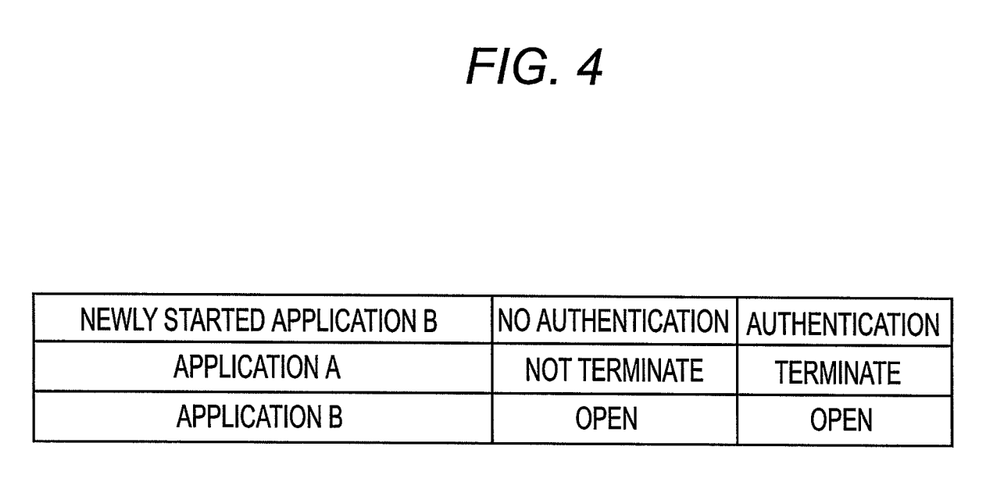
FIG. 4 is a table to show a mode of operation expansion.

FIG. 4 shows an expansion pattern in the processing in FIG. 2. In the processing, for example, if the application software B is newly started and is software requiring authentication in a state in which the application software A is already started, the application software A which is already started and may be used is forcibly terminated. In this case, it becomes impossible to use the application software A (of course, if it is again started, it is made possible to use the application software A.

According to the processing, operation of application software requiring authentication may be performed preferentially, so that continuation of processing for each user is simplified. Generally, the priority of work using application software requiring authentication is often high. According to the processing, the already started application software is forcibly terminated, so that a situation in which work using later started application software requiring authentication is left undone because of the effect of already started application software is prevented and continuation of processing is simplified. If newly started application software is software requiring no authentication, the already started application software is not terminated and may be used continuously, so that occurrence of a defect caused by forcibly terminating the application software is suppressed and continuation of processing is also simplified in this point.

Operation Example 2

Figure 5:
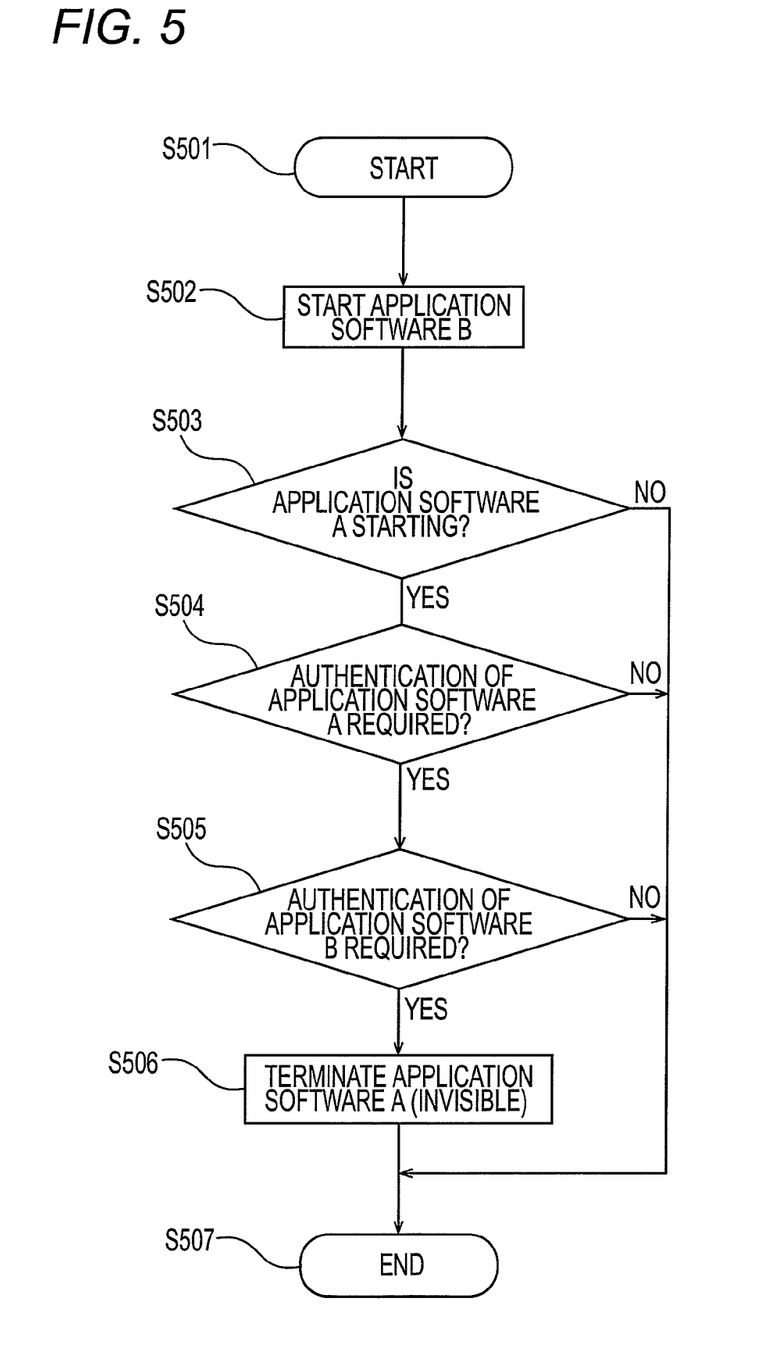
FIG. 5 is a flowchart to show an example of a processing procedure of the exemplary embodiment of the invention.

Another example of the operation of the information processing apparatus 100 will be discussed. FIG. 5 shows an example of the operation of the information processing apparatus 100. In the operation, prerequisites are the same as those of "operation example 1." When processing is started (step S501) and the user gives a start command of the application software B, the application software B is started (step S502). Whether or not the application software A is already started at the point in time is determined (step S503).

If the application software A is starting, the process goes to step S504; otherwise, the processing is terminated (step S507). At step S504, whether or not authentication of the already started application software A is required for operating the software is determined. If the already started application software A is application software requiring authentication for operation, the process goes to step S505; otherwise, the process goes to step S507 and the processing is terminated.

At step S505, whether or not authentication of newly started application software B is required for operating the software is determined. If the application software B is software requiring authentication for operation, the process goes to step S506; otherwise, the process goes to step S507 and the processing is terminated.

If the determination at step S503, S504, or S505 is NO and the process goes to step S507 and the processing is terminated, an operation screen of the application software B is displayed overlapping (see Step (B) in FIG. 3) an operation screen of the application software A (see Step (A) in FIG. 3) or the operation screen of the application software A and the operation screen of the application software B are displayed side by side (see Step (C) in FIG. 3). In this state, the application software A and the application software B may be operated.

When the process goes to step S506 from S505, the application software A which is already started and may be operated is terminated and the processing is terminated (step S507). In this case, the operation screen of the application software B is displayed and it is made possible to use the application software B. At step S506, the application software A may be placed in an invisible state without terminating the application software A. In this case, although the start state is maintained, no operation screen is displayed and if authentication is again conducted, the operation screen of the application software A appears and it is made possible to operate the application software A.

Figure 6:
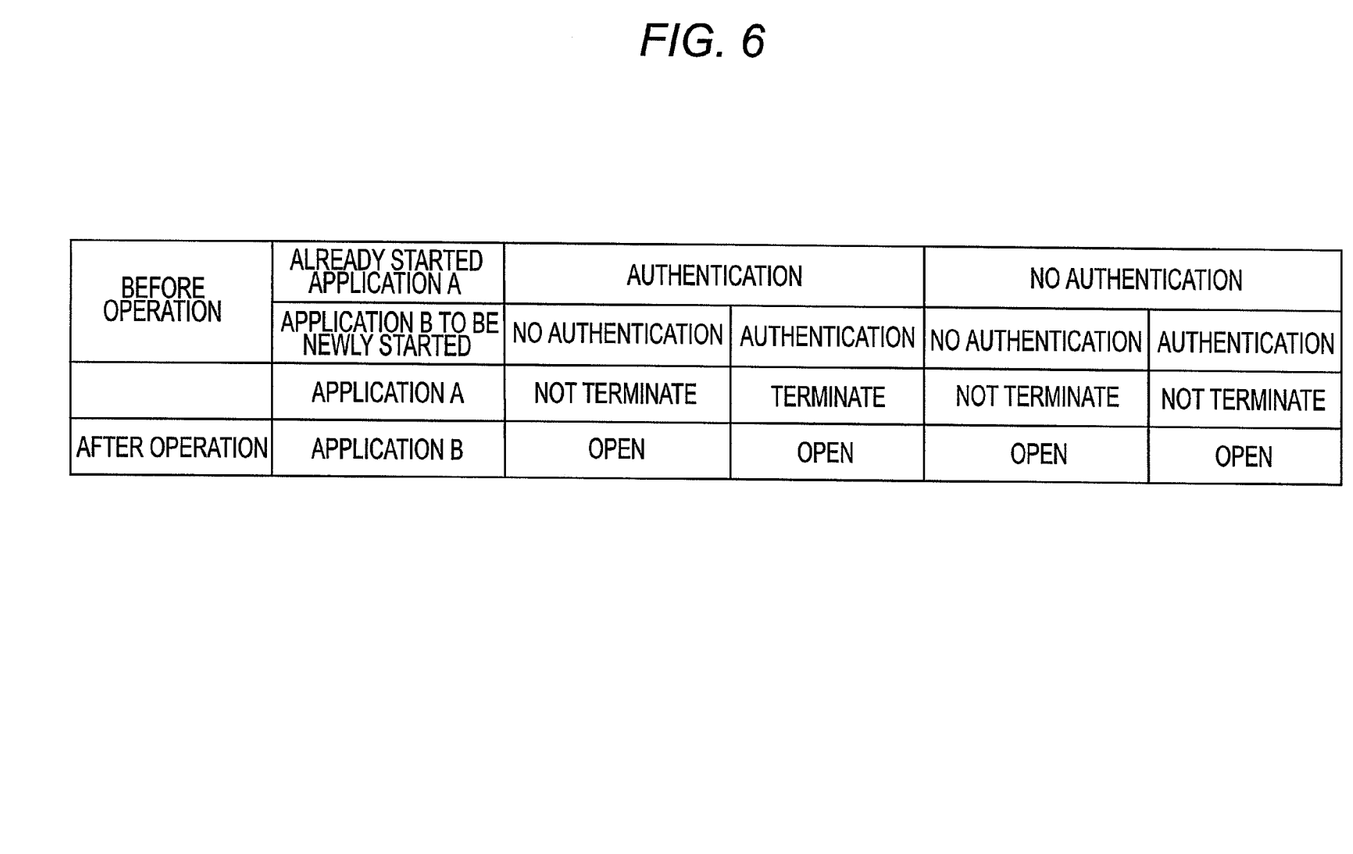
FIG. 6 is a table to show a mode of operation expansion.

FIG. 6 shows an expansion pattern in the processing in FIG. 5. In this case, authentication of both the application software B to be newly started and the already started application software A is required, the already started application software A is terminated. In so doing, a defective condition in which the already started application software A is erroneous operated as the user has an intention of operating the newly started application software B is circumvented.

Operation Example 3

Figure 7:
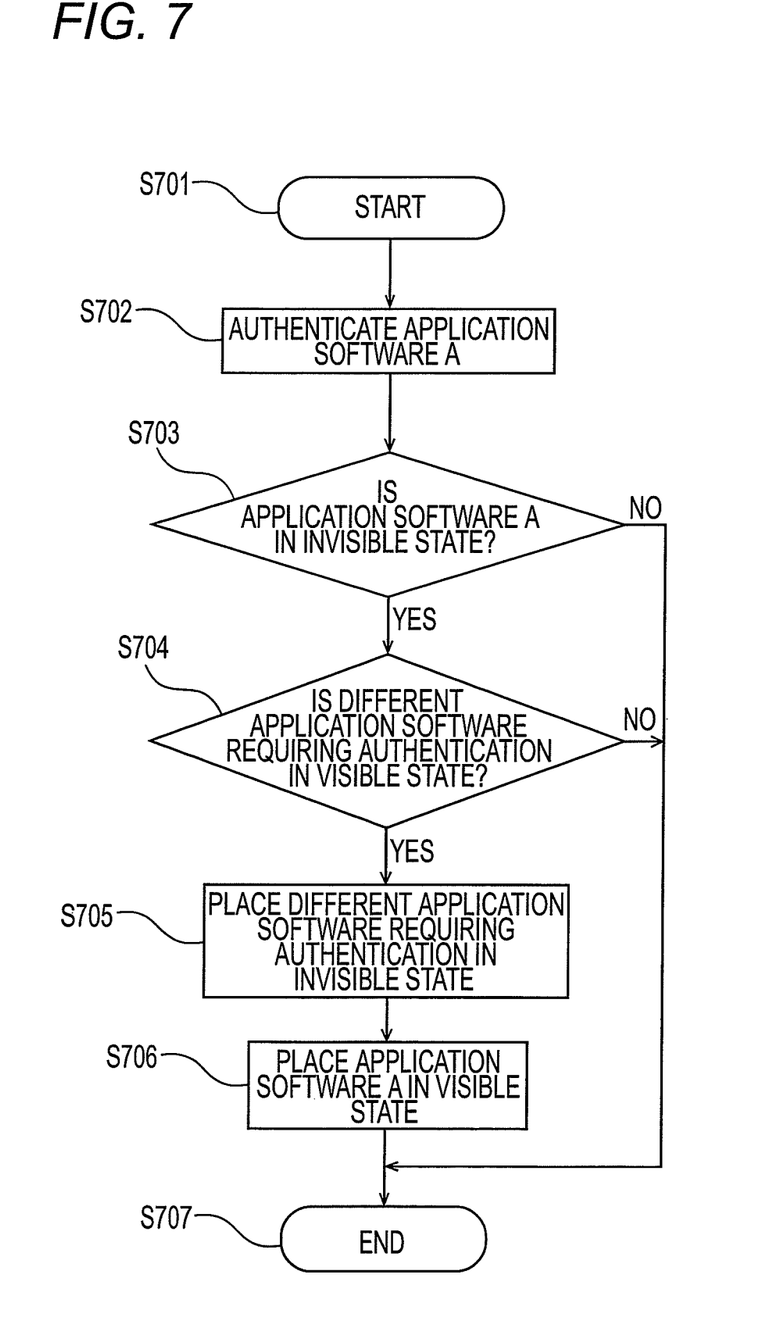
FIG. 7 is a flowchart to show an example of a processing procedure of the exemplary embodiment of the invention.

An example of the operation wherein when the application software A is placed in an invisible state without terminating the application software A at step S506 in FIG. 5, later the application software A is again authenticated will be discussed below:

FIG. 7 shows an example of the processing. First, as a prerequisite, it is assumed that some application software is in a start state and is placed in an invisible state. When processing is started (step S701) and the user authenticates the application software A using a magnetic card (step S702), whether or not the application software A is in a start state and an operation screen of the application software A is in an invisible state is determined (step S703).

If the application software A is in the start state and the operation screen is in the invisible state, the process goes to step S704; otherwise, the process goes to step S707 and the processing is terminated. At step S704, whether or not an operation screen of application software requiring authentication for operating the software other than the application software A is in a visible state (of course, at the point in time, authentication has been conducted and operation is in a possible state) is determined. If the operation screen of the application software requiring authentication for operating the software other than the application software A is in the visible state, the process goes to step S705; otherwise, the process goes to step S707 and the processing is terminated. Even if software other than the application software A is starting, if it does not require authentication for operating the software, the determination at step S704 becomes NO, the process goes to step S707, and the processing is terminated.

At step S705, an operation screen of different application software requiring authentication in a visible state at the point in time is placed in an invisible state. That is, the operation screen of application software requiring authentication for operating the software in a visible state at the point in time as the application software is in the start state is placed in an invisible state. The operation screen is placed in the invisible state, whereby the application software is starting, the operation screen is not seen and the application software may not be operated. Next, the operation screen of the application software A in the invisible state is placed in a visible state (step S706) and the processing is terminated.

An example of a transition of operation screens according to the processing in FIG. 7 will be discussed below: FIG. 7 shows an example of a transition of operation screens. Here, a state in which application software a and application software b each requiring authentication exist, the application software A is starting, a screen thereof is displayed, and the application software B does not start is the starting point (Step (A) in FIG. 8).

Figure 8:
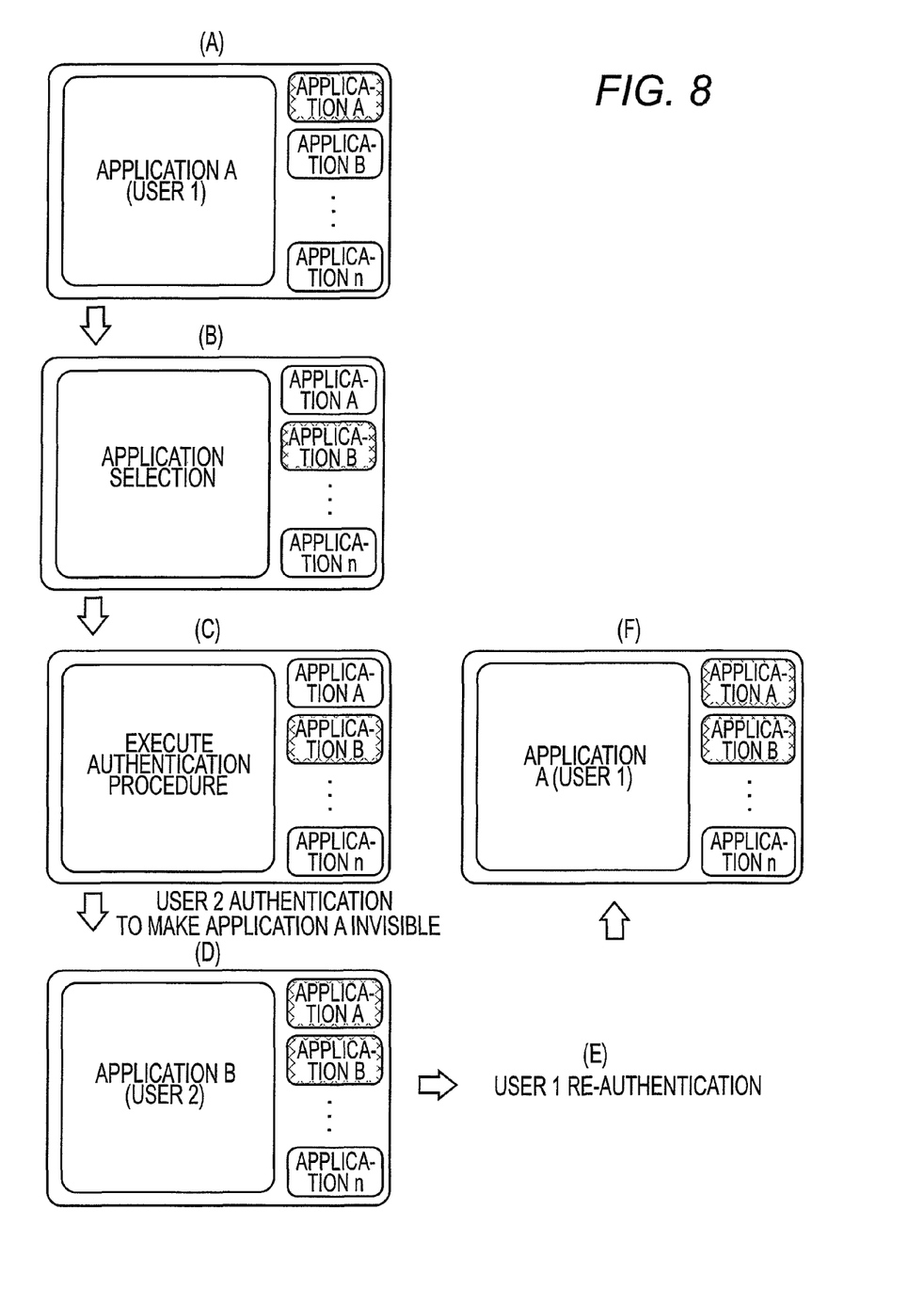
FIG. 8 is a screen display drawing to show an example of screen display of operation screens in the exemplary embodiment of the invention.

In the state in Step (A) in FIG. 8, when the application software B is selected (Step (B) in FIG. 8), the application software B requires authentication and thus a screen in Step (C) in FIG. 8 appears and authentication is requested. When user 2 permitted to use the application software B conducts authentication using a magnetic card, the application software A is placed in an invisible state, the application software B is started, and an operation screen thereof is displayed (Step (D) in FIG. 8).

In the state in Step (D) in FIG. 8, although both the application software A and the application software B are started, only the operation screen of the application software B is displayed for enabling the user to operate the application software B and the operation screen of the application software A is made invisible and the application software A may not be operated.

When re-authentication of user 1 is conducted in the state in Step (D) in FIG. 8, the application software A placed in the invisible state is placed in a visible state (can be operated) and the application software B is placed in an invisible state. Step (D) in FIG. 8 shows the state. When authentication of user 2 is conducted in the state in Step (F) in FIG. 8, the operation screen of the application software A is made invisible, the operation screen of the application software B in the invisible state before the authentication is placed in a visible state, and the state returns to the state in Step (D) in FIG. 8.

Here, the application software A and the application software B have been described; if a larger number of application software products requiring authentication exist, likewise, the operation screen of the last authenticated application software is made visible and the operation screen of the previously authenticated and non-terminated application software is placed in an invisible state.

Operation Example 4

Figure 9:
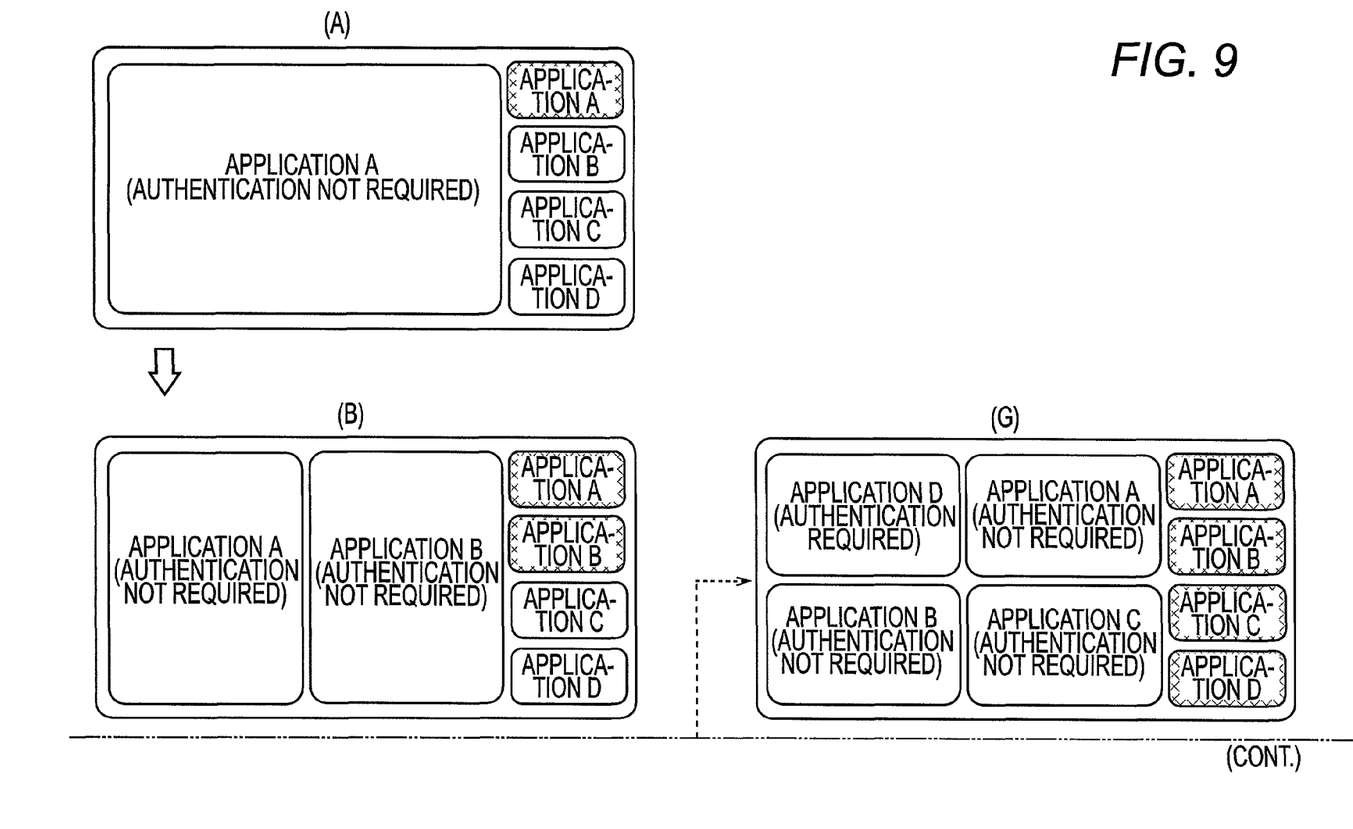
FIG. 9 is a screen display drawing to show an example of screen display of operation screens in the exemplary embodiment of the invention.

FIG. 9 shows an example of a transition of screen display. Here, as a prerequisite, application software A to application software C are application software not requiring authentication and application software D is application software requiring authentication.

First, when the application software A is selected, it is started and an operation screen thereof is displayed (Step (A) in FIG. 9). Since the application software A is software not requiring authentication, an operation screen of the application software A is displayed as it is.

When the application software B not requiring authentication is selected in the state in Step (A) in FIG. 9, the application software B and the application software A are displayed on the screen side by side (Step (B) in FIG. 9). In this case, both the application software A and the application software B may be operated.

When the application software C not requiring authentication is selected in the state in Step (B) in FIG. 9, the application software C and the application software A and the application software B are displayed on the screen side by side (Step (C) in FIG. 9). In this case, the application software to the application software C may be operated.

When application software D requiring authentication is selected in the state in Step (C) in FIG. 9), a screen for requesting the user to authenticate the application software D is displayed (Step (D) in FIG. 9). When the user authenticates the application software D to permit operation of the application software D (Step (E) in FIG. 9), the application software D is started as the application software A to the application software C are in the start state, and an operation screen of the application software D is displayed in the highest rank (Step (F) in FIG. 9).

As shown in Step (G) in FIG. 9, the application software D requiring authentication may also be displayed at a predetermined specific position on the screen (in this case, the upper left of the screen). In this case, when application software requiring authentication is started, it is displayed at the predetermined position on the screen. In so doing, when the operation screens of plural of application software products are displayed on the screen at the same time, the operation screen of the application software requiring authentication is displayed at the predetermined position on the screen and the user may easily visually recognize the operation screen of the application software requiring authentication.

(Others)

The system control section 400 illustrated in the exemplary embodiment may also be implemented as software in a personal computer. In this case, the function sections of the system control section 400 are implemented as software by a program installed in the personal computer. The authentication data input section 503 and the user input/output device section 500 are implemented as hardware included by the personal computer and external hardware.

The invention may be used for an art relating to operation of an electronic device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An information processing apparatus comprising:
a display control section that performs display control of a first operation screen for performing a first operation and a second operation screen for performing a second operation; and
a control section that determines whether a user needs to authenticate to display at least one of the first operation screen and the second operation screen and terminates the first operation screen or makes the first operation screen invisible based on the determination,
wherein the control section terminates the first operation screen or makes the first operation screen invisible if the control section determines that the user needs to authenticate to display the second operation screen and the user needs to authenticate to display the first operation screen in a state in which the first operation screen is displayed,
wherein the control section controls to display both the first operation screen and the second operation screen if the control section determines that the user does not need to authenticate to display the second operation screen in a state in which the first operation screen is displayed, and
wherein the control section controls to display both the first operation screen and the second operation screen if the control section determines that the user needs to authenticate to display the second operation screen and the user does not need to authenticate to display the first operation screen in a state in which the first operation screen is displayed.

2. The information processing apparatus according to claim 1, wherein the control section makes a display of the first operation screen visible and a display of the second operation screen invisible if the control section determines that the user needs to authenticate to display the first operation screen and the user needs to authenticate to display the second operation screen in a state where the first operation screen is invisible and the second operation screen is visible.

3. A non-transitory computer readable medium storing a computer readable program executable by a computer for causing a computer to execute a process, the process comprising:
displaying a first operation screen for performing a first operation and a second operation screen for performing a second operation;
determining whether a user needs to authenticate to display at least one of the first operation screen and the second operation screen;
controlling to terminate the first operation screen or make the first operation screen invisible based on the determining,
wherein the controlling terminates the first operation screen or makes the first operation screen invisible if it is determined that the user needs to authenticate to display the second operation screen and the user needs to authenticate to display the first operation screen in a state in which the first operation screen is displayed,
wherein the controlling controls to display both the first operation screen and the second operation screen if it is determined that the user does not need to authenticate to display the second operation screen in a state in which the first operation screen is displayed, and
wherein the controlling controls to display both the first operation screen and the second operation screen if it is determined that the user needs to authenticate to display the second operation screen and the user does not need to authenticate to display the first operation screen in a state in which the first operation screen is displayed.

* * * * *